United States Patent
Ortlepp

(10) Patent No.: US 7,566,016 B2
(45) Date of Patent: Jul. 28, 2009

(54) PULVERIZER WITH KEYLESS MAIN SHAFT

(75) Inventor: Richard P. Ortlepp, Cincinnati, OH (US)

(73) Assignee: ALSTOM Technology Ltd., Baden (CH)

( * ) Notice: Subject to any disclaimer, the term of this patent is extended or adjusted under 35 U.S.C. 154(b) by 284 days.

(21) Appl. No.: 11/491,111

(22) Filed: Jul. 24, 2006

(65) Prior Publication Data

US 2008/0017738 A1 Jan. 24, 2008

(51) Int. Cl.
B02C 15/00 (2006.01)
(52) U.S. Cl. .................................. 241/121; 241/291
(58) Field of Classification Search ......... 241/207–216, 241/117–121, 291
See application file for complete search history.

(56) References Cited

U.S. PATENT DOCUMENTS 2,112,359 A    3/1938   Crites
5,944,270 A    8/1999   Farris
6,024,311 A    2/2000   Prairie et al.
6,270,026 B1   8/2001   Piepho et al.
6,347,758 B1   2/2002   Mizak et al.
6,874,715 B1   4/2005   Moen et al.

OTHER PUBLICATIONS

PCT International Search Report dated Nov. 30, 2007—(PCT/US2007/071422).
Written Opinion of the International Search Authority dated Nov. 30, 2007—(PCT/US2007/071422).
Keyless Pulverizer Shafts, PIB 329, 1 page.
R.R. Piepho, "Pulverizer Maintenance Costs—A Burden or a Challenge?", Jul. 29-Aug. 1, 1996, Babcock & Wilcox, 4 pages.

*Primary Examiner*—Mark Rosenbaum
(74) *Attorney, Agent, or Firm*—Antonelli, Terry, Stout & Kraus, LLP.

(57) ABSTRACT

A main shaft and method for installing a main shaft for a pulverizer are provided herein. The main shaft includes at least a first tapered portion for accepting a yoke and a first associated threaded portion for securing the yoke to the main shaft. Also included is a second tapered portion for accepting a bevel gear assembly and a second associated threaded portion for securing the bevel gear assembly to the main shaft.

8 Claims, 5 Drawing Sheets

PULVERIZER WITH KEYLESS MAIN SHAFT

FIELD OF THE INVENTION

The present invention is related to pulverizers of the type that are used to effect therewith the pulverization of solid fossil fuels, and more particularly to a pulverizer having an improved main shaft.

BACKGROUND OF THE INVENTION

Pulverizers for grinding different types of materials are well known in the prior art. Pulverizers are also known as mills. Solid fossil fuels, such as coal, are one such material wherein there exists a need to grind the material in order to render the solid fossil fuel suitable for use in certain applications, although there are other materials such as gypsum, cement, minerals, etc. that need to be subjected to pulverization as well in order to permit their use in various applications. Fossil fuel fired power generation systems represent one such application in which it is desired to employ pulverized solid fossil fuel, e.g., coal as the fuel. Such a system is commonly referred to as a solid fossil fuel fired system. Pulverized solid fossil fuel firing is favored over other methods of burning solid fossil fuel because pulverized fossil fuel burns like gas and, therefore, fires are easily lighted and controlled.

For purposes of the discussion that follows, the solid fossil fuel fired systems referred to above typically consist of the following major operating components: a solid fossil fuel feeder, an apparatus for pulverizing solid fossil fuel, a distribution system for distributing the pulverized solid fossil fuel, a furnace in which the pulverized solid fossil fuel is to be burned, and the requisite controls for effecting the proper operation of the solid fossil fuel fired system. Of particular interest herein is the apparatus for pulverizing the solid fossil fuel, which will often be referred to hereinbelow as a solid fossil fuel pulverizer. Solid fossil fuel pulverizers are not new. They have been known to exist in the prior art for more than half a century. Furthermore, many improvements in the construction and/or mode of operation of solid fossil fuel pulverizers have been made during this period.

There are a number of features that it is advantageous for any solid fossil fuel pulverizer to possess, but particularly for those which are designed for employment in a solid fossil fuel fired power generation system. Reference is had here to features such as reliability, low power consumption, minimum maintenance and high capacity. In addition, such a solid fossil fuel pulverizer advantageously should also be characterized by quiet operation, integrated lubrication systems, convenient adjustment and control of solid fossil fuel flow and fineness, and the ability to handle the high temperature air that is required for high moisture solid fossil fuel.

One particular type of conventional solid fossil fuel pulverizer is commonly referred to in the industry as an EL type pulverizer. EL type pulverizers are manufactured by the Babcock & Wilcox Company (B&W) and were first produced in the early 1950's. EL type pulverizers have a ball-and-ring design (also known as a ball-and-race design) in which the ball-bearing principle is used to grind the coal. This design uses two vertical axis, horizontal grinding rings and a set of balls placed between the horizontal grinding rings. The lower, or bottom, grinding ring rotates, while the upper, or top, grinding ring remains stationary and is spring loaded to create grinding pressure. The coal is ground by contact with the upper and lower grinding rings and balls (collectively, the grinding elements). The lower and upper grinding rings are each provided with a race having a predefined, matching track contour that engages the balls. The force from the upper grinding ring pushes the balls against the coal layer on the lower grinding ring. The grinding rings and the balls are made of abrasion resistant alloys and comprise the major wear parts of the mill. Ground coal is swept from the grinding zone defined by the grinding rings and the balls by air for final particle size classification and subsequent pneumatic transport to one or more coal burners.

More particularly, FIG. 1 shows a cross section of a B&W EL type pulverizer generally depicted as numeral 100. The pulverizer 100 has a stationary top ring 104, one rotating bottom ring 106, and one set of balls 108 that comprise the grinding elements, as discussed above. The pressure required for efficient grinding is obtained from externally adjustable dual purpose springs 110. The bottom ring 106 is driven by the yoke 112 which is attached to a vertical main shaft assembly 114 of the pulverizer 100. The top ring 104 is held stationary by the dual purpose springs 110. Raw coal is fed into the grinding zone where it mixes with partially ground coal that forms a circulating load. Pulverizer air causes the coal to circulate through the grinding elements where some of it is ground in each pass through the row of balls 108. As the coal becomes fine enough to be picked up by the air it is carried to a classifier 140 where coal of a desired fines is separated from the stream entering the classifier 140 and is carried out with the air. Oversized material is returned to the grinding zone. The pulverizer 100 is driven by a bevel gear assembly 141 positioned on the vertical main shaft 114 in engagement with a pinion shaft gear 142 positioned on the horizontal pinion shaft 116. The bevel gear assembly 141 comprises a bevel gear 143, which is mounted to a gear center 144 that is, in turn, mounted to the vertical main shaft 114.

FIG. 2 is a more detailed view of the main shaft 114. Recessed into the main shaft 114 is a yoke keyway 201A and a bevel gear keyway 203A. The yoke keyway 201A is associated with a yoke key 201B, and the bevel gear keyway 203A is associated with a bevel gear key 203B, which is also often referred to as a center gear key. The yoke key 201B fits into the yoke keyway 201A and a corresponding slot (not shown in the Figures) in the yoke 112 when the yoke 112 is mated to the main shaft 114. The yoke key 201B, when installed, transfers drive torque from the rotating main shaft 114 to the yoke 112. The bevel gear key 203B fits into the bevel gear keyway 203A and a corresponding slot (not shown in the Figures) in the bevel gear assembly 141 when the bevel gear assembly 141 is mated to the main shaft 114. The bevel gear key 203B, when installed, transfers drive torque from the rotating horizontal pinion shaft 116 to the main shaft 114. The yoke 112 is secured to the main shaft 114 via yoke locknut 136A, and the bevel gear assembly 141 is secured to the main shaft. 114 via gear locknut 136B.

Failure of the main shaft 114 occurs most commonly at one of the keyways 201A or 203A. This is because the material removed from the main shaft 114 to form a keyway creates a stress concentration point that weakens the main shaft 114. The stresses that initiate main shaft 114 failure in EL type pulverizers primarily come from the energy of the several balls 108 which roll along in between the upper 104 and lower 106 grinding rings and also rotate about the vertical axis of the main shaft 114, and the reaction forces of the spring loaded top grinding ring 104 to the balls 108. It has been determined that eccentric loadings on the main shaft 114 caused by the movements of these balls is a primary cause of such main shaft failures. When a main shaft 114 fails, expensive and time consuming repairs must be undertaken, including replacing the failed main shaft 114.

Accordingly, a need exists for an improved main shaft that is not subject to keyway failure.

Furthermore, because of the use of keys, assembly of the main shaft 114 and its components is a complicated process. When installing the bevel gear assembly 141 on the main shaft 114 the slot formed in the bevel gear assembly 141 must be aligned with the bevel gear keyway 203A so that the bevel gear assembly 141 can be seated over the bevel gear key 203B in the bevel gear keyway 203A. Likewise, when installing the yoke 112 on the main shaft 114 the slot formed in the yoke 112 must be aligned with the yoke keyway 203A so that the yoke 112 can be seated over the yoke key 201B in the yoke keyway 201A. The yoke 112 and bevel gear assembly 141 aligning processes are both time consuming and difficult tasks.

Also complicating the process of assembling the main shaft 114, once the bevel gear assembly 141 has been properly seated, the gear locknut 136B must be installed. Also, once the yoke 112 has been properly seated, the yoke locknut 136A must be installed. Locknut installation is a tedious and time consuming job, involving heating the yoke 112 or bevel gear assembly 141, and hammering the yoke locknut 136A or gear locknut 136B. Accordingly, a need exist for an improved technique to assemble a main shaft and its components.

OBJECTS OF THE INVENTION

It is an object of the present invention to provide a pulverizer which overcomes the deficiencies of existing pulverizers.

It is also an object of the present invention to provide an EL type pulverizer which overcomes the deficiencies of existing EL type pulverizers.

Yet another object of the present invention is to provide an improved pulverizer main shaft.

Still another object of the present invention is to provide an improved EL type pulverizer main shaft.

Another object of the present invention is to provide an improved technique for assembling a pulverizer main shaft with its associated components.

Yet another object of the present invention is to provide an improved technique for assembling an EL type pulverizer main shaft with its associated components.

The above-stated objects, as well as other objects, features, and advantages, of the present invention will become readily apparent from the following detailed description which is to be read in conjunction with the appended drawings.

SUMMARY OF THE INVENTION

In accordance with one aspect of the present invention, a main shaft for a pulverizer and a method for installing a main shaft in a pulverizer are provided herein. The main shaft of the present invention excludes any keyway or associated key. As such, when installing the main shaft of the present invention in a pulverizer, no keyway alignments need be made.

At one end of the main shaft is a first threaded portion that has threads along at least a portion of its length. Adjacent to this portion is a first tapered portion which is narrowest closest to the first threaded portion. The first tapered portion is where a yoke rests. Adjacent to the first tapered portion is an intermediate portion which has a circumference that is larger than the largest circumference of the first tapered portion.

Also included in the main shaft is a second threaded portion that is next to the intermediate portion. The second threaded portion has a circumference larger than the circumference of the intermediate portion. The threads of the second threaded portion extend along at least some of the length of the second threaded portion. A second tapered portion is then next to the second threaded portion. This second tapered portion is narrowest next to the second threaded portion. The second tapered portion is where a bevel gear assembly rests. The main shaft also includes an end portion that is next to the second tapered portion. This circumference of the end portion is larger than the largest circumference of the second tapered portion.

According to another aspect of the present invention, the main shaft includes an upper jackbolt nut which is for threading onto the first threaded portion for securing the yoke to the main shaft, as well as a lower jackbolt nut which is for threading onto the second threaded portion for securing the bevel gear assembly to the main shaft. A jackbolt nut threads onto the main shaft and has multiple nuts which are tightened to secure the yoke or bevel gear assembly to the main shaft.

In a further aspect of the present invention, the intermediate portion includes multiple sub-portions. Each of the sub-portions has a different circumference, each different circumference being greater than the greatest circumference of the first tapered portion, and less than the circumference of the second threaded portion.

In a still further aspect of the present invention, the end portion includes multiple sub-portions. Each of the sub-portions of the second end portion has a different circumference, each different circumference being greater than the greatest circumference of the second tapered portion.

According to yet another aspect of the present invention, the pulverizer is an EL type pulverizer. And, in still another aspect of the invention, the main shaft is a replacement main shaft.

In accordance with yet another aspect, a method for installing a main shaft in a pulverizer comprises: seating a bevel gear onto a first tapered length of the main shaft without aligning any keyway; securing the seated bevel gear assembly to the main shaft; seating a yoke onto a second tapered length portion of the main shaft subsequent to seating the bevel gear and without aligning any keyway; and securing the seated yoke onto the main shaft.

In accordance with yet another aspect, a main shaft for a pulverizer comprises; a first threaded portion located at an axial end of the main shaft and having threads extending along at least a portion of the first threaded portion; a first tapered portion adjacent to the first threaded portion, the first tapered portion having a narrowest circumference closest to the first length and configured to accept a yoke; an intermediate portion adjacent to the first tapered portion, the intermediate portion having a circumference greater than a greatest circumference of the first tapered portion; a second threaded portion located adjacent to the intermediate portion, the second threaded portion having a circumference greater than the circumference of the intermediate portion and having threads extending along at least a portion of the second threaded portion; a second tapered portion adjacent to the second threaded portion, the second tapered portion having a narrowest circumference closest to the second threaded portion and configured to accept a bevel gear assembly; and an end portion adjacent to the second tapered length, the end portion having a circumference less than a greatest circumference of the second tapered portion. The first and second tapered portions exclude any keyway, and the main shaft further comprises: an upper jackbolt nut adapted to thread onto the first threaded portion to secure the yoke to the main shaft; and a lower jackbolt nut adapted to thread onto the second threaded portion to secure the bevel gear assembly to the main shaft.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
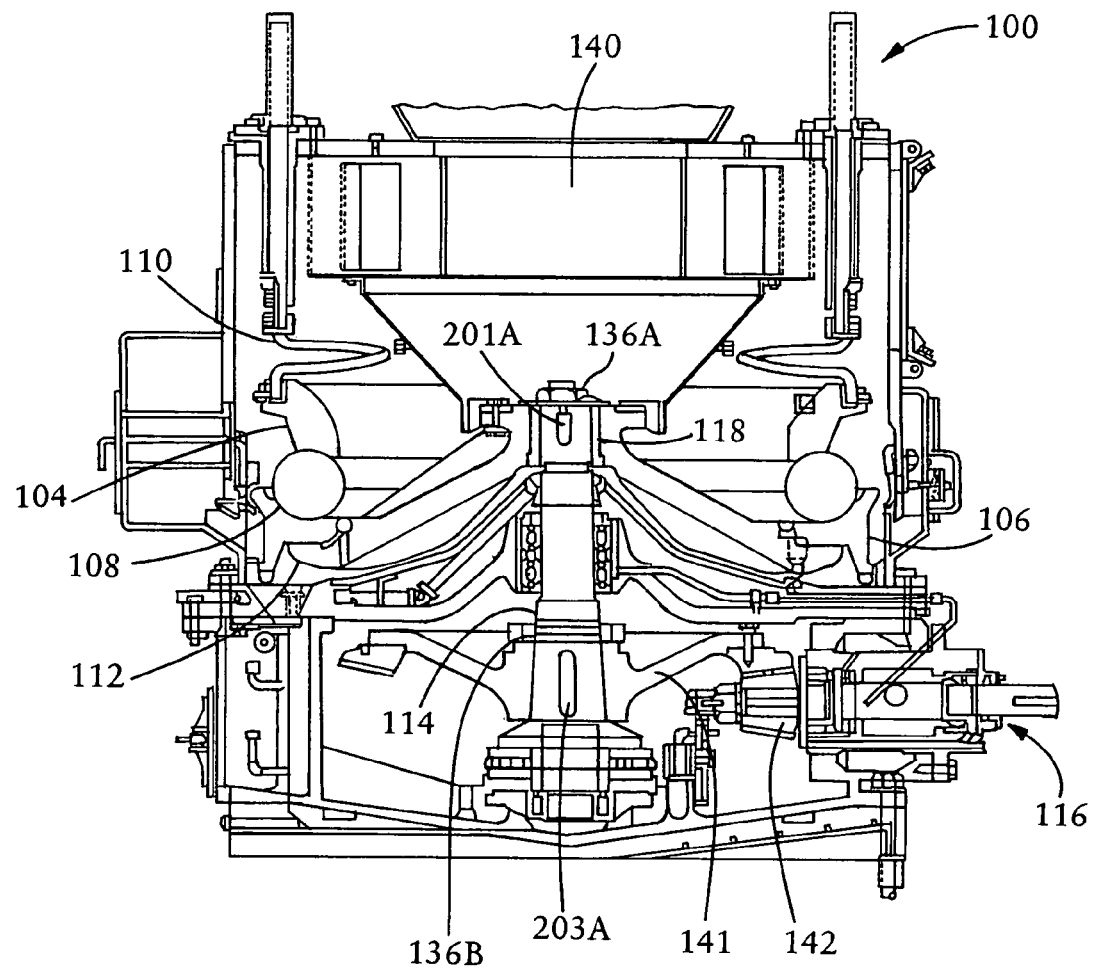
FIG. 1 is a sectional view of a prior art B&W EL type ball and race pulverizer.
Figure 2:
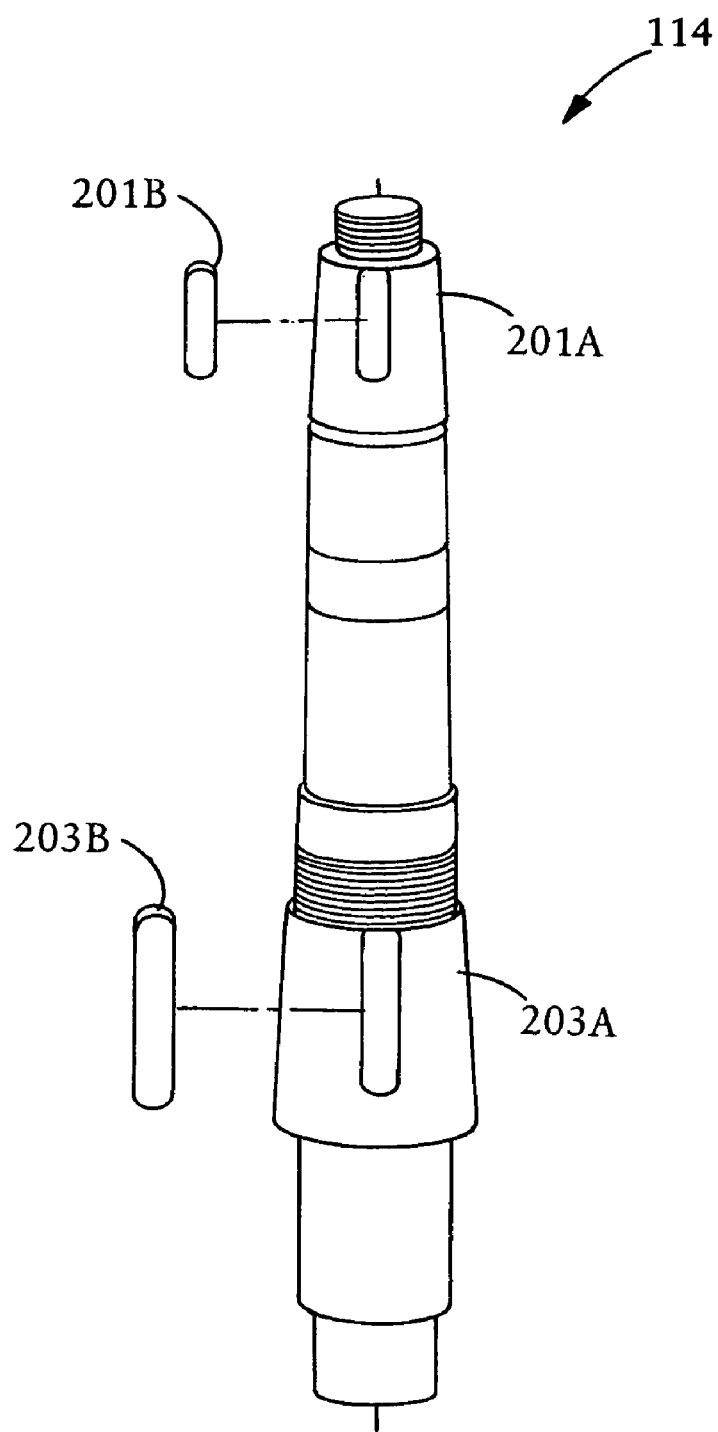
FIG. 2 is an external view of a prior art main shaft employed in the type EL ball and race pulverizer of FIG. 1.
Figure 3:
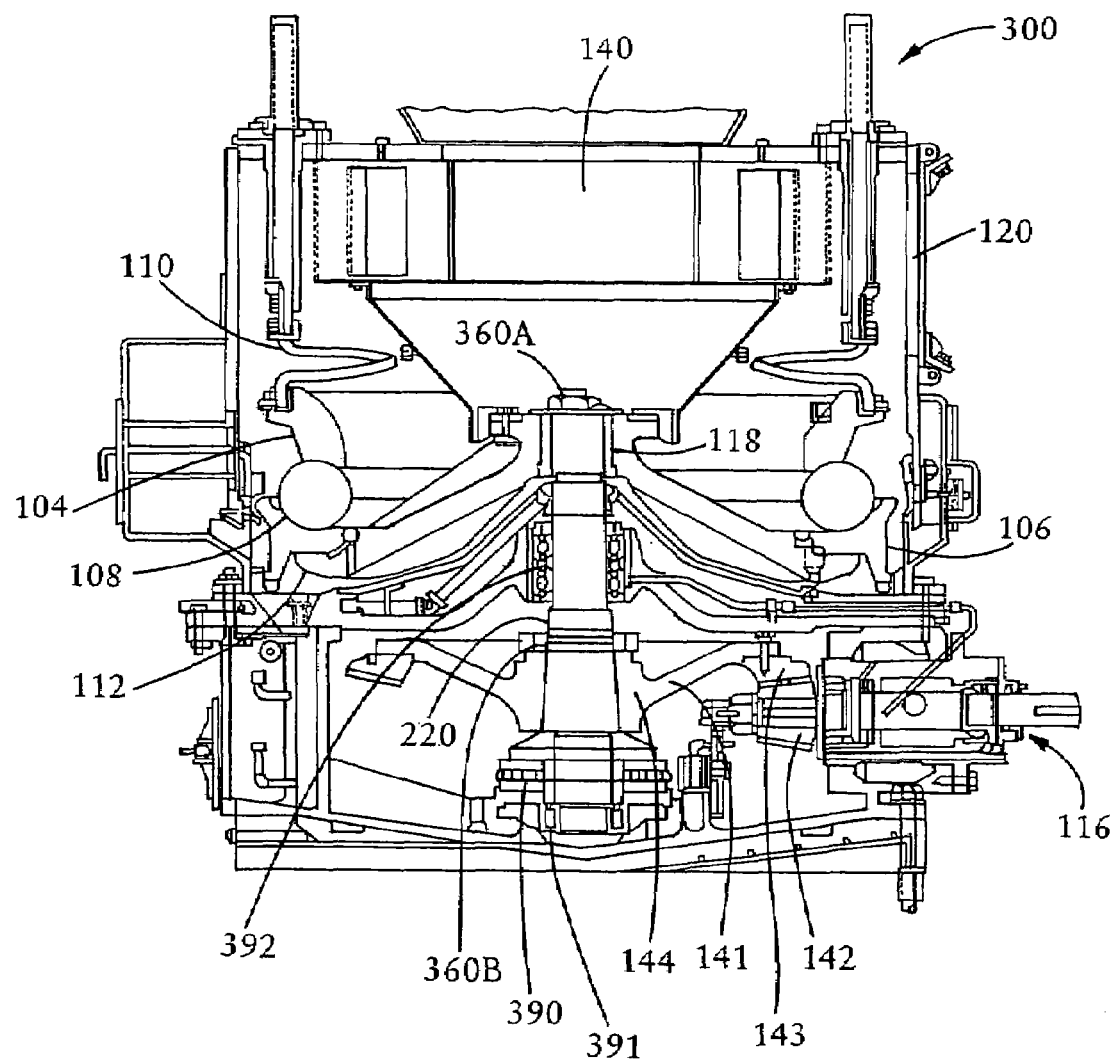
FIG. 3 is a sectional view of a B&W EL type ball and race pulverizer with a main shaft in accordance with certain aspects of the present invention installed therein.

Referring to the drawings generally, wherein like numerals designate the same or functionally similar elements throughout the several drawings, FIG. 3 shows a perspective view of an EL type pulverizer, generally designated 300, for grinding incoming material, such as coal. Referring to FIG. 3, the grinding or crushing of coal in the EL type pulverizer 300 is conducted within a pulverizer housing 120. The pulverizer housing 120 contains a plurality of pulverizer balls 108, which are resting in a track established between a bottom grinding ring 106 and a top grinding ring 104. The balls 108, bottom grinding ring 106 and top grinding ring 104 comprise the grinding wear parts of a type EL pulverizer 300.

The lower grinding ring 106 rests on top of a pulverizer yoke 112, which rotates about a vertical axis established by the main shaft 220 and yoke 112 of the type EL pulverizer 300. The upper grinding ring 104 is subjected to an external loading force required for grinding the coal by dual-purpose springs 110. These dual-purpose springs 110 are referred to as such because in addition to providing the loading forces required to grind the coal, they also supply the forces required to keep the top grinding ring 104 from experiencing excessive radial movement, circumferential twisting, and eccentric rotation with respect to the lower grinding ring 106. The outside diameter of the upper grinding ring 104 comprises "flutes" (not shown), which provide primary circulation of partially ground coal in the grinding wear parts, and which also provide tracking forces to the pulverizer balls 108 to allow concentric rotation and orbiting of the balls 108 in the track of the upper grinding ring 104 and lower grinding ring 106. Also included is bevel gear assembly 141 and pinion shaft gear 142, as well as a thrust bearing 390 and radial bearings 391 and 392 in which the main shaft 220 sits. The bevel gear assembly 141 comprises a bevel gear 143, which is mounted to a gear center 144 that is, in turn, mounted to the vertical main shaft 114.

Figure 4:
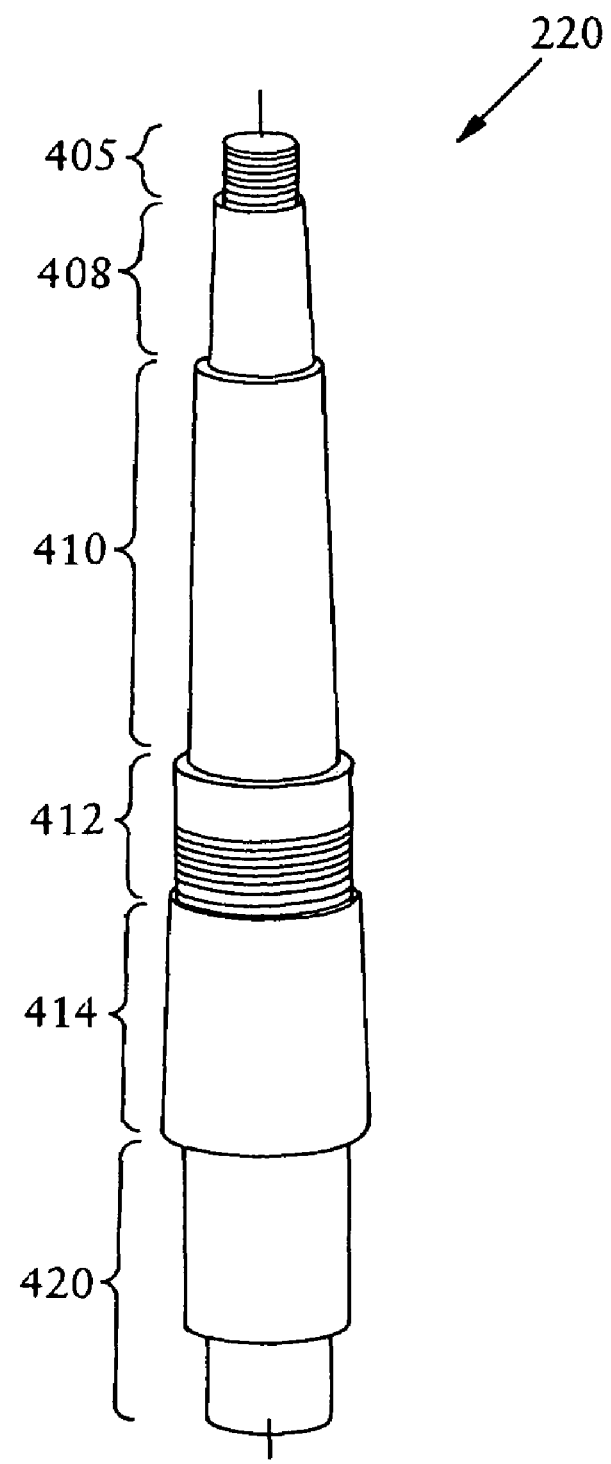
FIG. 4 is an external view of the main shaft of FIG. 3 in accordance with certain aspects of the present invention.

FIG. 4 is a detailed depiction of the main shaft 220 in accordance with an embodiment of the present invention. In the embodiment shown, main shaft 220 lacks any keyway and associated key. That is, the yoke keyway and the bevel gear keyway of the prior art are not present. Because main shaft 220 lacks any keyway, it is believed to be at least as twice as strong as existing main shafts with keyways.

The main shaft 220 includes a yoke threaded portion 405 located at a first end of the main shaft 220. The yoke threaded portion 405 may be, as desired, threaded along all or only a portion of its length. Adjacent to the yoke threaded portion 405 is a yoke tapered portion 408 which is narrowest adjacent to the yoke threaded portion 405. The narrowest circumference of the yoke tapered portion 408 is greater than the circumference of the yoke threaded portion 405. In the prior art, a yoke keyway is formed in this portion, but is lacking in the yoke tapered portion 408 of the main shaft 220 of the present embodiment.

Adjacent to the yoke tapered portion 408 is an intermediate portion 410, which is configured to be received in the inner sleeve of the radial bearing 392. The intermediate portion, as desired, may include multiple sub-portions. For example, if the intermediate portion 410 does not include multiple sub-portions, the intermediate portion 410 preferably has the same circumference along its length. However, if the intermediate portion 410 has multiple sub-portions, at least two of the sub-portions may have different circumferences along their respective lengths.

Adjacent to the intermediate portion 410 is a bevel gear threaded portion 412. The circumference of the bevel gear threaded portion 412 is greater than the circumference of the intermediate portion 410, or any sub-portion included therein. Also, the bevel gear threaded portion 412 may be, as desired, threaded along its entire length, or only a portion of its length.

Adjacent to the bevel gear threaded portion 412 is a bevel gear tapered portion 414. The narrowest portion of the bevel gear threaded portion 412 is adjacent to the bevel gear threaded portion 412 and has a greater circumference than the bevel gear threaded portion 412. In the prior art, a bevel gear keyway is formed in this portion, but is lacking in the bevel gear tapered portion 414 of the main shaft 220 of the present embodiment.

Adjacent to the bevel gear tapered portion 414 is an end portion 420 that has a smaller circumference than the greatest circumference of the bevel gear tapered portion 414. The end portion is configured to be received within the thrust bearing 390 and radial bearing 391. As desired, the end portion 420 may include multiple sub-portions. If the end portion 420 does not include multiple sub-portions, the end portion 420 preferably has the same circumference along its length. However, if the end portion 420 has multiple sub-portions, at least two of the sub-portions preferably have different circumferences along their respective lengths, with each sub-portion having a circumference less than largest circumference of the bevel gear tapered portion 414.

Also, in accordance with the present embodiment, the yoke 112 is secured to the main shaft 220 by an upper jackbolt nut 360A, not a yoke locknut, as in the prior art. That is, the yoke 112 rests upon the yoke tapered portion 408 and the upper jackbolt nut 360A is secured to the yoke threaded portion 405. Likewise, the bevel gear assembly 141, in accordance with the present invention, is secured to the main shaft 220 by a lower jackbolt nut 360B, not a prior art gear locknut. The bevel gear assembly 141 rests upon the bevel gear tapered portion 414 and the lower jackbolt nut 360B is secured to the bevel gear threaded portion 412.

Figure 5:
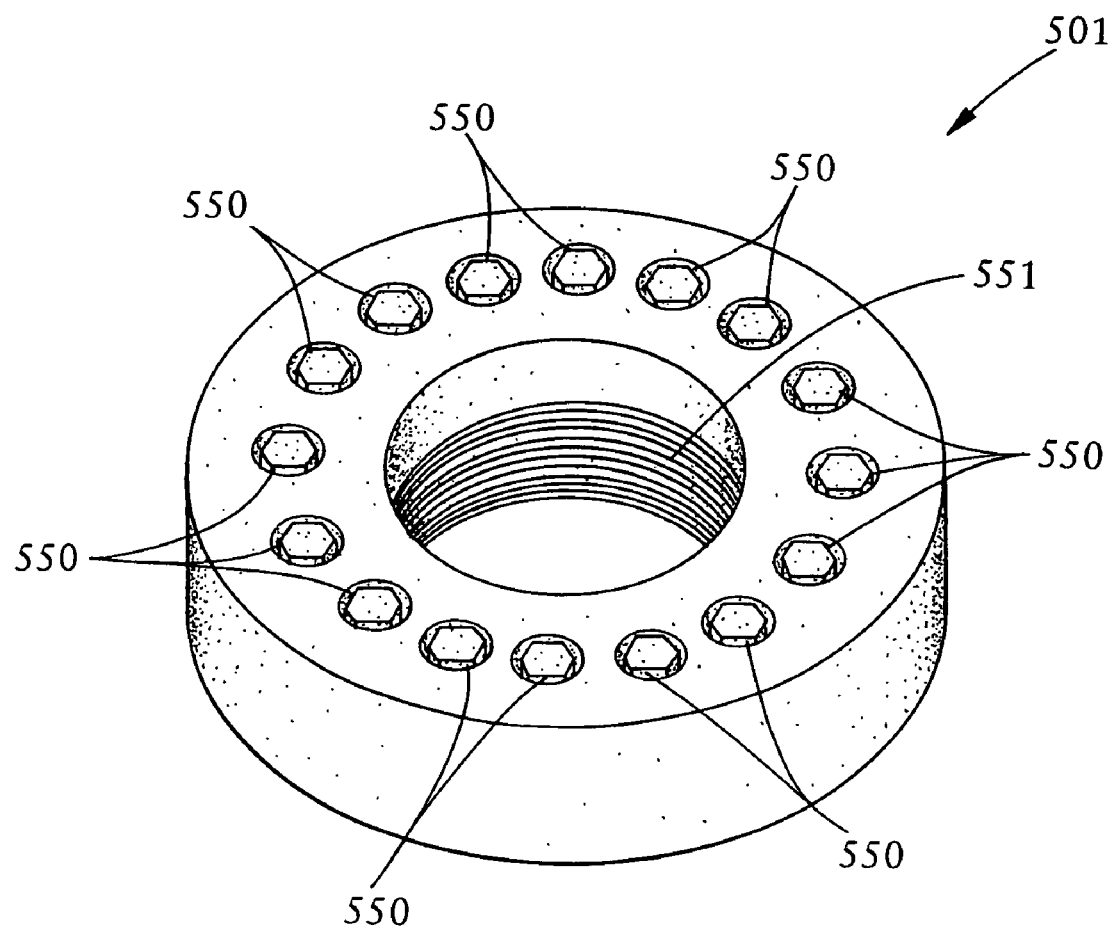
FIG. 5 is an external view of a jackbolt nut usable with the main shaft of FIG. 3 in accordance with certain aspects of the present invention.

FIG. 5 is a simplified depiction of a jackbolt nut, depicted generally as 501. As used herein, a "jackbolt nut" is a threaded nut having a plurality of threaded apertures disposed therethrough, and having a plurality of bolts threadably disposed within the plurality of threaded apertures. Such jackbolt nuts are commercially available, for example, from Superbolt, Inc. of Carnegie, Pa.

Jackbolt nut 501 threads onto the main shaft 220 like a conventional locknut, with a threaded portion 405 or 412 of the main shaft 220 engaging central threads 551 of the jackbolt nut 501. Once threaded onto the main shaft 220, the bolts 550 are tightened to produce an axial force against either the yoke 112 or the bevel gear assembly 141. The axial force provided by the bolts 550 forces the yoke 112 or bevel gear assembly 141 onto the tapered portions of the main shaft 220 to prevent the yoke 112 or bevel gear assembly 141 from rotating relative to the main shaft 220. Thus, referring again to FIG. 3, the upper jackbolt nut 360A provides the functionality of both the yoke locknut and the yoke key of the prior art. That is, the upper jackbolt nut 360A both secures the yoke 112 to the main shaft 220 and provides for the transfer of torque from the main shaft 220 to the yoke 112. Likewise, the lower jackbolt nut 360B provides the functionality of both the gear locknut and the bevel gear key of the prior art. The lower jackbolt nut 360B both secures the bevel gear assembly 141 to the main shaft 220 and provides for the transfer of torque from the horizontal pinion shaft gear 142 to the main shaft 220. Removal of the jackbolt nuts 501 simply requires loosening of the bolts 550 to release the force on the yoke 112 or bevel gear assembly 141, and unthreading the jackbolt nuts 501.

As will be appreciated by one of ordinary skill in the art, the hammering and heating of locknuts, as discussed above with reference to the prior art, are not required to install or remove the jackbolt nuts 501. Furthermore, when placing the yoke 112 or bevel gear assembly 141 onto the main shaft 220, no key alignment is necessary. Thus, assembly and disassembly of the yoke 112 and bevel gear assembly 141 onto the main shaft 220 is simplified over that of prior art shafts.

The present invention is not to be limited in scope by the specific embodiments described herein. Indeed, various modifications of the present invention in addition to those described herein will be apparent to those of skill in the art from the foregoing description and accompanying drawings. Thus, such modifications are intended to fall within the scope of the appended claims.

What is claimed is:

1. A main shaft for a pulverizer, comprising:
    a first threaded portion located at an axial end of the main shaft and having threads extending along at least a portion of the first threaded portion;
    a first tapered portion adjacent to the first threaded portion, the first tapered portion having a narrowest circumference closest to the first length and configured to accept a yoke;
    an intermediate portion adjacent to the first tapered portion, the intermediate portion having a circumference greater than a greatest circumference of the first tapered portion;
    a second threaded portion located adjacent to the intermediate portion, the second threaded portion having a circumference greater than the circumference of the intermediate portion and having threads extending along at least a portion of the second threaded portion;
    a second tapered portion adjacent to the second threaded portion, the second tapered portion having a narrowest circumference closest to the second threaded portion and configured to accept a bevel gear assembly;
    an end portion adjacent to the second tapered length, the end portion having a circumference less than a greatest circumference of the second tapered portion;
    an upper jackbolt nut adapted to thread onto the first threaded portion to secure the yoke to the main shaft; and
    a lower jackbolt nut adapted to thread onto the second threaded portion to secure the bevel gear assembly to the main shaft;
    wherein the main shaft excludes any keyway.

2. The main shaft of claim 1 wherein:
    the intermediate portion includes a plurality of sub-portions; and
    each of the plurality of sub-portions has a different circumference, each different circumference being greater than the greatest circumference of the first tapered portion, and less than the circumference of the second threaded portion.

3. The main shaft of claim 2, wherein:
    the end portion includes a plurality of sub-portions; and
    each of the plurality of sub-portions has a different circumference, each different circumference being less than the greatest circumference of the second tapered portion.

4. The main shaft of claim 1, wherein the pulverizer is an EL type pulverizer.

5. The main shaft of claim 1 wherein the main shaft is a replacement main shaft.

6. A main shaft for a pulverizer, comprising:
    a first threaded portion located at an axial end of the main shaft and having threads extending along at least a portion of the first threaded portion;
    a first tapered portion adjacent to the first threaded portion, the first tapered portion having a narrowest circumference closest to the first length and configured to accept a yoke;
    an intermediate portion adjacent to the first tapered portion, the intermediate portion having a circumference greater than a greatest circumference of the first tapered portion;
    a second threaded portion located adjacent to the intermediate portion, the second threaded portion having a circumference greater than the circumference of the intermediate portion and having threads extending along at least a portion of the second threaded portion;
    a second tapered portion adjacent to the second threaded portion, the second tapered portion having a narrowest circumference closest to the second threaded portion and configured to accept a bevel gear assembly; and
    an end portion adjacent to the second tapered portion, the end portion having a circumference less than a greatest circumference of the second tapered portion;
    wherein the first and second tapered portions exclude any keyway, and the main shaft further comprises:
    an upper jackbolt nut adapted to thread onto the first threaded portion to secure the yoke to the main shaft; and
    a lower jackbolt nut adapted to thread onto the second threaded portion to secure the bevel gear assembly to the main shaft.

7. The main shaft of claim 6, wherein the pulverizer is an EL type pulverizer.

8. The main shaft of claim 7 wherein the main shaft is disposed in the EL type pulverizer in place of a main shaft including at least one keyway.

* * * * *